United States Patent
Mizuhashi et al.

(10) Patent No.: US 8,508,484 B2
(45) Date of Patent: Aug. 13, 2013

(54) LIQUID CRYSTAL DISPLAY DEVICE

(75) Inventors: Hiroshi Mizuhashi, Kanagawa (JP);
Yuko Yamauchi, Tokyo (JP); Takeo Koito, Aichi (JP); Tsutomu Tanaka, Kanagawa (JP); Shuji Hayashi, Aichi (JP); Takayuki Nakanishi, Aichi (JP); Yoshiharu Nakajima, Kanagawa (JP)

(73) Assignee: Japan Display West, Inc., Chita (JP)

( * ) Notice: Subject to any disclaimer, the term of this patent is extended or adjusted under 35 U.S.C. 154(b) by 287 days.

(21) Appl. No.: 12/650,747

(22) Filed: Dec. 31, 2009

(65) Prior Publication Data

US 2010/0188347 A1    Jul. 29, 2010

(30) Foreign Application Priority Data

Jan. 27, 2009  (JP) ................. 2009-015129

(51) Int. Cl.
*G06F 3/041* (2006.01)
(52) U.S. Cl.
USPC .......................... 345/172; 345/173
(58) Field of Classification Search
USPC .................................. 345/172–173
See application file for complete search history.

(56) References Cited

U.S. PATENT DOCUMENTS

| | | | |
|---|---|---|---|
| 6,011,533 A * | 1/2000 | Aoki .............................. | 345/92 |
| 6,501,529 B1 | 12/2002 | Kurihara et al. | |
| 2005/0184971 A1 * | 8/2005 | Ogino et al. ................... | 345/173 |
| 2008/0079697 A1 * | 4/2008 | Lee et al. ........................ | 345/173 |
| 2009/0146964 A1 * | 6/2009 | Park et al. ....................... | 345/173 |
| 2009/0225047 A1 * | 9/2009 | Lee et al. ........................ | 345/173 |
| 2010/0079381 A1 * | 4/2010 | Hayashi et al. ................ | 345/172 |
| 2011/0134051 A1 * | 6/2011 | Lin ................................. | 345/173 |

FOREIGN PATENT DOCUMENTS

| | | |
|---|---|---|
| JP | 03-020817 | 1/1991 |
| JP | 2007-52369 | 3/2007 |
| JP | 2007-95044 | 4/2007 |
| JP | 2008-065302 | 3/2008 |
| JP | 2008-146077 | 6/2008 |
| JP | 2010-182120 | 8/2008 |

* cited by examiner

*Primary Examiner* — Quan-Zhen Wang
*Assistant Examiner* — Tony Davis
(74) *Attorney, Agent, or Firm* — Robert J. Depke; The Chicago Technology Law Group, LLC

(57) ABSTRACT

An embodiment of the invention provides a liquid crystal display device, including a first substrate; a second substrate; a liquid crystal layer formed between the first substrate and the second substrate; a first sensor electrode formed on the first substrate; a second sensor electrode formed on the second substrate, and disposed so as to be adapted to contact the plurality of first sensor electrodes close to one another by pressing from a side of either the first substrate or the second substrate; and a sensor drive circuit for applying a voltage to a first wiring electrically connected to one of the plurality of first sensor electrodes which the second sensor electrode is adapted to contact by the pressing, and detecting a change in potential of a second wiring electrically connected to another one of the plurality of first sensor electrodes.

8 Claims, 9 Drawing Sheets

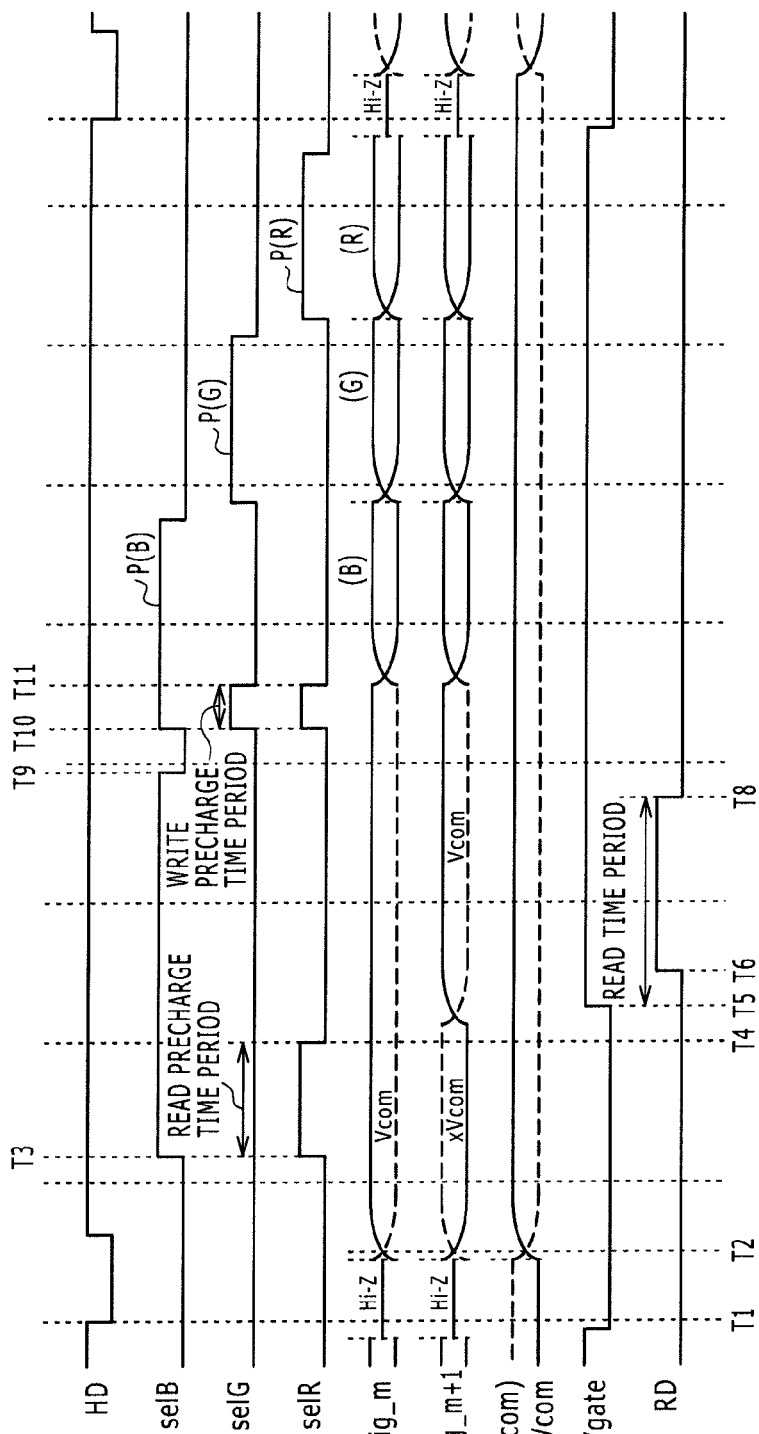

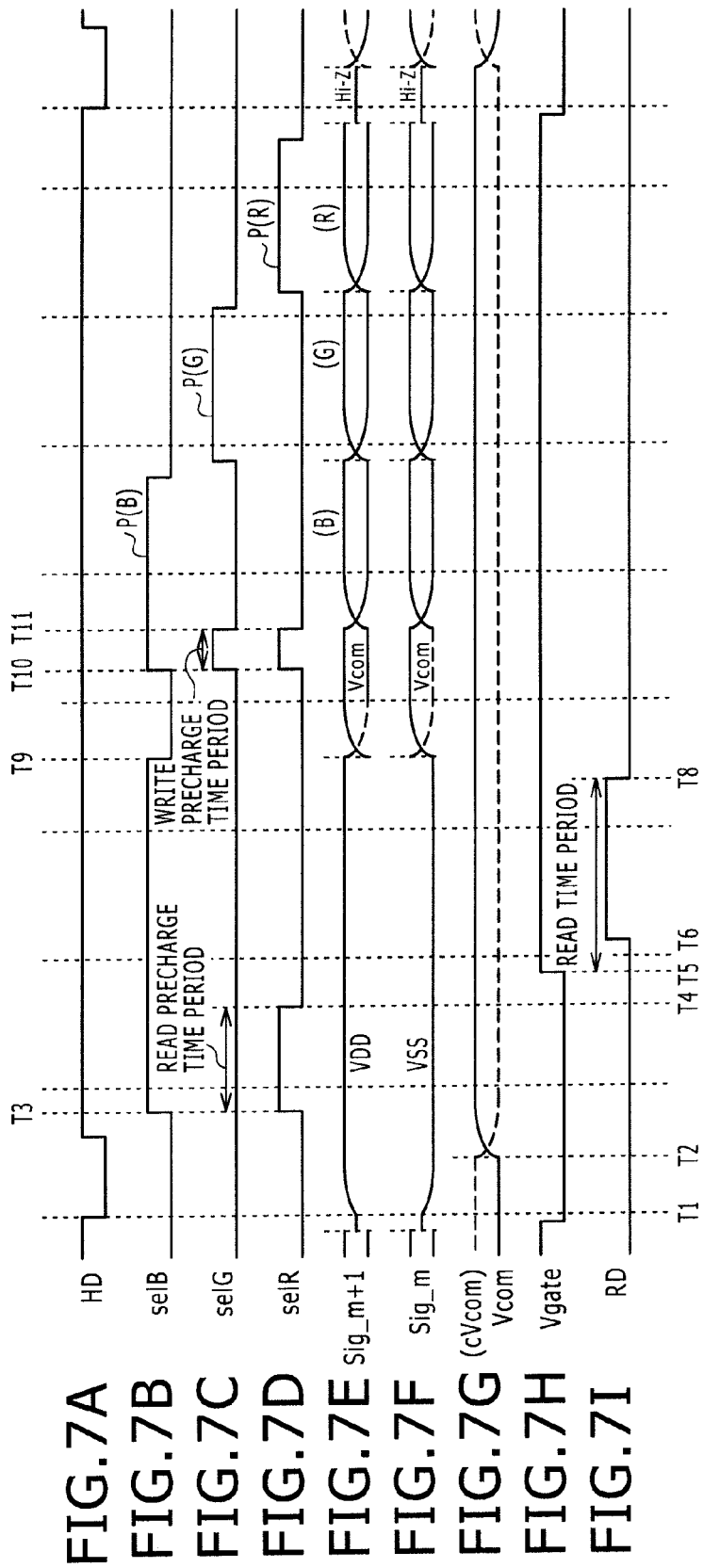

LIQUID CRYSTAL DISPLAY DEVICE

The present application claims priority to Japanese Patent Application JP 2009-015129 filed in the Japanese Patent Office on Jan. 27, 2009, the entire content of which is hereby incorporated by reference.

BACKGROUND OF THE INVENTION

1. Field of the Invention

The present invention relates to a liquid crystal display device which has a function of a contact sensor by disposing contact sensor electrodes so as to sandwich a liquid crystal layer formed between a first substrate and a second substrate between the contact sensor electrodes.

2. Description of the Related Art

In recent years, in liquid crystal display devices, there has been realized a liquid crystal display device having a sensor function called "a touch panel." In this case, an instruction from a user is inputted to the touch panel by utilizing an icon or the like displayed on a screen of the liquid crystal display device.

The touch panel is installed on a display surface side of the liquid crystal display device so that instruction contents shown on the screen of the liquid crystal display device can be selected by either a hand of a human being or an object (for example, a stylus pen). When either the hand of the human being or the object directly touches the touch panel, the touch panel detects a position, within a panel surface, where either the hand of the human being or the object contacts the touch panel. The liquid crystal display device receives the contents instructed in accordance with the position where the contact is detected in the form of an input signal, and carries out an operation based on the input signal thus received.

A resistance film system (contact sensor system), an electrostatic capacitance system, or an optical system is known as a detection system of the touch panel.

It is studied that in the resistance film system (contact sensor system), the liquid crystal display panel and the touch panel are formed integrally with each other.

There is known a liquid crystal display device with a contact sensor in which for the purpose of forming the liquid crystal display panel and the touch panel integrally with each other in the resistance film system (contact sensor system), a pair of electrodes which contact each other when the user presses the panel surface with his/her finger or the like are formed on two sheets of substrates sandwiching the liquid crystal layer between them, respectively. Here, the pair of electrodes will be referred hereinafter to as either "first and second sensor electrodes" or "touch electrodes." This liquid crystal display device with the contact sensor, for example, is described in Japanese Patent Laid-Open Nos. 2007-52369, 2007-95044, and 2001-75074 (referred to as Patent Documents 1, 2 and 3, respectively, hereinafter).

In the liquid crystal display device, the liquid crystal is enclosed between two sheets of substrates, thereby forming the display panel. In addition, in the liquid crystal display device, spacers for maintaining a distance (cell gap) at which the two sheets of substrates are opposite to each other are disposed between the two sheets of substrates in suitable size and with suitable density, thereby adjusting a strength which the display panel should have in a phase of pressing of the display surface side. When the entire disposition area of the spacers is large, the substrate on the display surface side is hardly bent by a pressing force, and also the first and second sensor electrodes do not readily contact each other. On the other hand, although the entire disposition area of the spacers is small, the first and second sensor electrodes readily contact each other, the strength of the display panel is insufficient.

Thus, the first and second sensor electrodes have to be made to readily contact with each other in a state in which the spacers are suitably disposed between the two sheets of substrates so as to obtain the desired panel strength. For this reason, in the liquid crystal display device described in Patent Documents 1, 2 and 3, "a height adjusting layer" having a height (a size in a thickness direction of the liquid crystal) smaller than that of each of the spacers is formed on at least one side of the first and second sensor electrodes. Thus, a gap defined between the first and second sensor electrodes (hereinafter referred to as "a sensor gap") is determined depending on the cell gap, the height of the height adjusting layer, the electrode thickness, and the like.

Even the contact caused by application of a small external pressure can be detected as the sensor gap is smaller. Therefore, it is better that the sensor gap is small to a certain extent from a viewpoint of enhancement of the sensitivity.

On the other hand, when the sensor gap is too small, the sensitivity becomes too high. Thus, in the resistance film system, the optical sensor gap is set mainly based on a difference in height between each of the spacers, and the height adjusting layer.

SUMMARY OF THE INVENTION

Even when the sensor gap is optimally set, since the size of the sensor gap is a fraction of the size of the cell gap, a foreign matter is held between the sensor electrodes, so that a switch becomes faulty in some cases. The probability of the switch fault abruptly increases as the sensor gap becomes smaller, which impedes the enhancement of the sensitivity and detection precision of the display panel integrated resistance film system contact sensor.

The present invention has been made in order to solve the problem described above, and it is therefore desirable to provide a liquid crystal display device having a contact sensor, in which unintended contact between two sensor electrodes hardly occurs, provided inside a display panel.

In order to attain the desire described above, according to an embodiment of the present invention, there is provided a liquid crystal display device including: a first substrate; a second substrate; a liquid crystal layer formed between the first substrate and the second substrate; a first sensor electrode formed on the first substrate; a second sensor electrode formed on the second substrate, and disposed so as to be adapted to contact the plurality of first sensor electrodes close to one another by pressing from a side of either the first substrate or the second substrate; and a sensor drive circuit for applying a voltage to a first wiring electrically connected to one of the plurality of first sensor electrodes which the second sensor electrode is adapted to contact by the pressing, and detecting a change in potential of a second wiring electrically connected to another one of the plurality of first sensor electrodes.

In accordance with the configuration described above, the sensor drive circuit can detect a short-circuit or open state among the plurality of first sensor electrodes based on the change in potential of the second wiring.

Here, let us consider the case where the number of first sensor electrodes is two as an example. When all the two first sensor electrodes contact the first sensor electrode, the voltage set from the first wiring is transmitted to the second wiring through one of the two first sensor electrodes, the second sensor electrode, and the other of the two first sensor electrodes in order. For this reason, a change occurs in the potential of the second wiring held in a floating state.

On the other hand, when even one of the two first sensor electrodes does not contact the second sensor electrode (when the contact sensor is in an OFF state), the voltage described above is not transmitted through the contact sensor. For this reason, no change occurs in the potential of the second wiring.

Here, for the cause by which the contact sensor is held in the OFF state, there are thought two cases, that is, the case where the pressing force applied from the outside is insufficient, and the case where although the pressing force applied from the outside is sufficient, the foreign matter is held between the first and second electrodes. Of them, the latter case is the case where the normal switching operation is impeded, and thus has to be prevented from being caused as much as possible.

In the case where that foreign matter has a conductive property, when there are two or more contacts between the electrodes, the probability of the switch fault due to that conductive foreign matter (the unintended interelectrode short-circuit) is small as the number of contacts further increases. The reason for this is because the switch is not turned ON unless the conductive foreign matters are held between all the contacts, and thus in any of other cases, the normal operation of the switch is ensured.

According to the present embodiments, it is possible to provide the liquid crystal display device having the contact sensor, in which the unintended contact between the two sensor electrodes hardly occurs, provided inside the display panel.

BRIEF DESCRIPTION OF THE DRAWINGS

FIGS. 6A to 6I are respectively timing charts explaining sensor drive and display write control in the liquid crystal display device according to the second example of the embodiment of the present invention;

FIGS. 7A to 7I are respectively timing charts explaining sensor drive and display write control in a liquid crystal display device according to a change of the second example of the embodiment of the present invention;

DETAILED DESCRIPTION OF THE PREFERRED EMBODIMENTS

The preferred embodiments of the present invention will be described in detail hereinafter with reference to the accompanying drawings.

The description will be given below in the following order.
1.Embodiment: Basic structure and configuration
2.First example: Concrete example 1
3.Second example: Concrete example 2
4.Modification of second example (control change in second example)
5.Modifications of embodiment
6.Application examples (electronic apparatuses)
<1.Embodiment>

Figure 1:
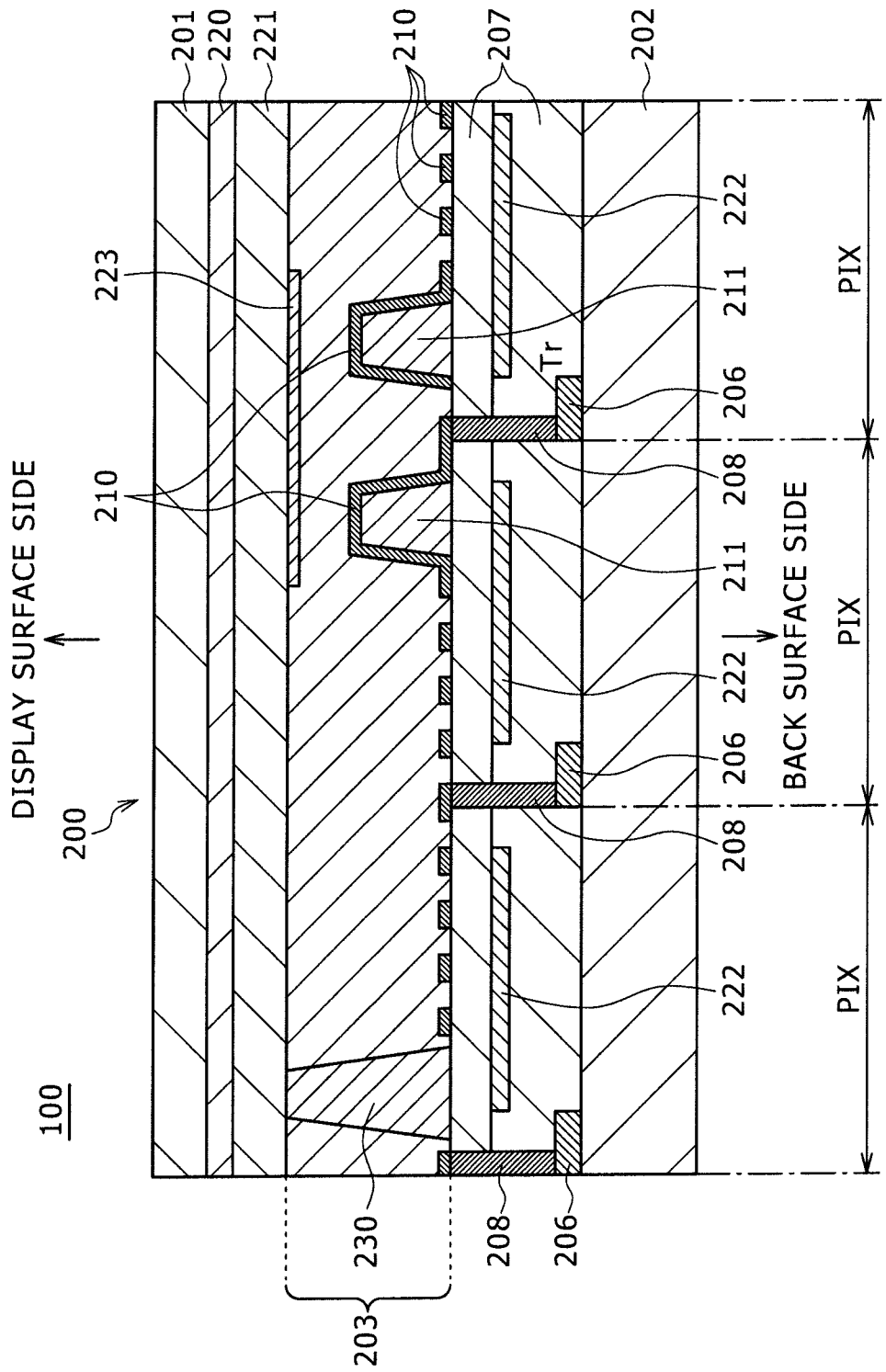
FIG. 1 is a schematic cross sectional view of a liquid crystal display device according to an embodiment of the present invention.

FIG. 1 is a schematic cross sectional view of a liquid crystal display device having an Field Fringe Switching (FFS) mode.

The liquid crystal display device 100 illustrated in FIG. 1 includes a liquid crystal panel 200, a backlight (not shown), a drive portion (not shown) for driving the liquid crystal panel 200 and the backlight.

In the liquid crystal panel 200 shown in FIG. 1, an upper side in FIG. 1 is "a display surface side," and a lower side in FIG. 1 is "a back surface side." The backlight is disposed on the back surface side so as to be close to the liquid crystal panel 200.

In the liquid crystal panel 200 shown in FIG. 1, a color filter substrate 201 and a Thin Film Transistor (TFT) array substrate 202 each serving as "a first substrate or a second substrate" face at a distance each other. The TFT array substrate 202 is called "a drive substrate" as well, and the color filter substrate 201 is called "a counter substrate" as well.

Although details will be described later, pixel electrodes, wirings, and transistors Tr are each disposed in a matrix on the TFT array substrate 202. As a result, when the liquid crystal panel 200 for example, is viewed from the display surface side, it is found out that a plurality of pixels PIXs are disposed in a matrix. The pixel PIX is a minimum unit at which a gradation can change.

As shown in FIG. 1, a liquid crystal layer 203 is formed so as to be held between the color filter substrate 201 and the TFT array substrate 202.

After predetermined functional layers are laminated and formed on the color filter substrate 201 and the TFT array substrate 202, respectively, the two sheets of color filter substrate 201 and TFT array substrate 202 are disposed so as to face each other, and a liquid crystal is injected and sealed between the color filter substrate 201 and the TFT array substrate 202, thereby forming the liquid crystal layer 203.

The TFT array substrate 202 is made of a material, such as a glass, having a high degree of transparency, and a gate electrode (not shown) of the transistor Tr is formed on the TFT array substrate 202. A TFT layer 206 becoming a body area of the transistor Tr is formed on the gate electrode through a thin gate insulating film (not shown). Although details are omitted in its illustration in FIG. 1, an impurity is implanted into the TFT layer 206, thereby forming a source region and a drain region.

It is noted that the gate electrode (not shown) may be lengthwise wired along a cross section shown in FIG. 1 to be used as a scanning line as well. Since the gate electrode 204 is made of a high-melting point metallic material such as molybdenum, when a wiring resistance of the gate electrode is desired to be reduced, the gate electrode is suitably connected to a wiring of an upper layer (not shown).

A multi-layer insulating film 207 is formed above the TFT array substrate 202 so as to bury therein the transistor Tr thus formed.

A conductive layer such as a plug 208 of the transistor Tr, and a signal line (not shown) formed from a metallic wiring made of aluminum or the like are buried in the multi-layer insulating film 207. As will be described later, the signal line is lengthwise wired in a direction perpendicularly intersecting with the gate electrode (scanning line) 204.

As shown in FIG. 1, common electrodes 222 each made of a transparent electrode material are buried in the multi-layer insulating film 207. Although the common electrodes 222 may be separated from one another so as to correspond to the pixels PIXs, respectively, the common electrodes 222 are at least collectively driven by the same potential in a pixel row corresponding to the display line.

Pixel electrodes 210 each of which is used as "a first sensor electrode" as well are formed on the multi-layer insulating film 207 so as to be connected to the plugs 208. Each of the pixel electrodes 210 is made of a transparent electrode material.

The liquid crystal display device 100 of the embodiment is a liquid crystal display device having a Field Fringe Switching (FFS) mode. For this reason, as shown in FIG. 1, each of the pixel electrodes 210 is formed into a strip-like shape through patterning. The pixel electrode 210 made of the transparent material and an area having no member adapted to block a light in its periphery are called "a light transmitting area." Also, the wirings of the gate electrode and the signal line 209, and an area in which the transmission of the light is blocked by the transistor Tr and the like are called "a light blocking area."

Each of the pixel electrodes 210 made of the transparent electrode material has a plurality of slits. The pixel electrode 210 is an electrode through which an electric field is applied to the liquid crystal layer 203 every pixel. A pixel gradation is determined in accordance with a potential (display pixel potential) of the pixel electrode 210 in a phase of application of the electric field. Thus, a video signal is supplied from the signal line (not shown) for the purpose of giving the display pixel potential, and a predetermined potential of the video signal thus supplied is sampled by the transistor Tr.

In the FFS mode, an electric field having a strength corresponding to a pixel gradation is applied across the common electrode 222 formed above the TFT array substrate 202, and the pixel electrode 210 formed on the common electrode 222 through the insulating film. The common electrodes 222 are formed in positions where they face off against the liquid crystal layer 203 through the slits of the respective pixel electrodes 210. Therefore, an approximately transverse electric field is applied to the liquid crystal layer 203.

A height adjusting layer 211 is formed under a part of the pixel electrode 210, and a second alignment film (not shown) is formed on the pixel electrode 210 in advance.

A plurality of functional films are laminated on the surface, on the liquid crystal layer 203 side, of the color filter substrate 201.

More specifically, the color filter substrate 201 is made of a material, such as a glass, having a high degree of transparency, and the color filter layer 220 is formed on the color filter substrate 201. The color filter layer 220 has a filter area dyed with a predetermined color such as red (R). With regard to the color of the filter area, one pixel is designated with one color, and the color arrangement for the pixels is determined in accordance with a predetermined pattern. For example, the arrangement of the three colors of red (R), green (G) and blue (B) is set as one unit, and this color arrangement is repeated in a matrix.

There are the case where a non-filter area is provided between each adjacent two filter areas, and the case where no non-filter area is provided between each adjacent two filter areas. The non-filter area may be formed as a black matrix area for light blocking, or may have a structure obtained by locally removing the color filter film.

A planarizing film 221 is formed on the color filter layer 220, and a pixel short-circuit electrode 223 as "a second sensor electrode" becoming a switch piece called "the counter electrode" as well is formed on the planarizing film 221. The pixel short-circuit electrode 223, for example, is made of a transparent electrode material, and is formed as a stripe-like electrode which is common to a plurality of pixels, for example, two pixels PIXs in the first embodiment.

It is noted that the pixel short-circuit electrode 223 may also be structured so as to be common to three or more pixels. In this case, the pixel short-circuit electrode 223 is formed into a pattern shape suitable for this structure.

When the color filter substrate 201 is pressed with an external force, the pixel short-circuit electrode 223 contacts the two pixel electrodes 210 provided in the adjacent two pixels, respectively, thereby generating interpixel short-circuit. As a result, the touch sensor detects the pressed position in accordance with the generation of the interpixel short-circuit. Details of the detection method will be described later.

It should be noted that since a spacer 230 for supporting the liquid crystal layer 203 in a thickness direction is disposed either every plural pixels or every pixel, even when the external force is applied to the color filter substrate 201, the liquid crystal layer 203 is deformed merely to a certain extent.

Preferably, a disposition portion and a size (strength) of the spacer 230 are suitably determined so that the liquid crystal layer 203 is most largely deformed (the color filter substrate 201 is bent) in a portion in which the adjacent two pixel electrodes 210 and the pixel short-circuit current 223 contact each other. In addition, a height (a size in a substrate facing direction) of the height adjusting layer 211 is suitably determined in accordance with the degree of the bending of the color filter substrate 201 in the contact portion.

Here, although the height adjusting layer 211 may be formed into any planar shape, for example, the height adjusting layer 211 is formed as an isolated pattern of either a circle or an ellipsoid. The purpose of providing the height adjusting layer 211 is that the contact between the adjacent two pixel electrodes 210 and the pixel short-circuit electrode 223 is made satisfactory, and that the alignment film (not shown) (on the side of the TFT array substrate 202) is prevented from being formed in the portion in which the adjacent two pixel electrodes 210 and the pixel short-circuit electrode 223 contact each other. Although depending on the process as well, the height of the height adjusting layer 211 is preferably set at 2 µm or more. In addition, when the height adjusting layer 211 is provided in the light transmission area, the height adjusting layer 211 becomes an obstacle to the light transmission. Therefore, the height adjusting layer 211 is preferably provided in the light blocking portion (such as the black matrix or the light blocking area becoming a shadow of the wirings). Alternatively, the height adjusting layer 211 may also be formed in a portion becoming a shadow of the gate electrode, a portion becoming a shadow of the signal lines, or the like.

It is noted that since the pixel electrode 210 and the common electrode 222 face each other through the insulating film 207, a hold capacitor is defined between the pixel electrode 210 and the common electrode 222.

Figure 2:
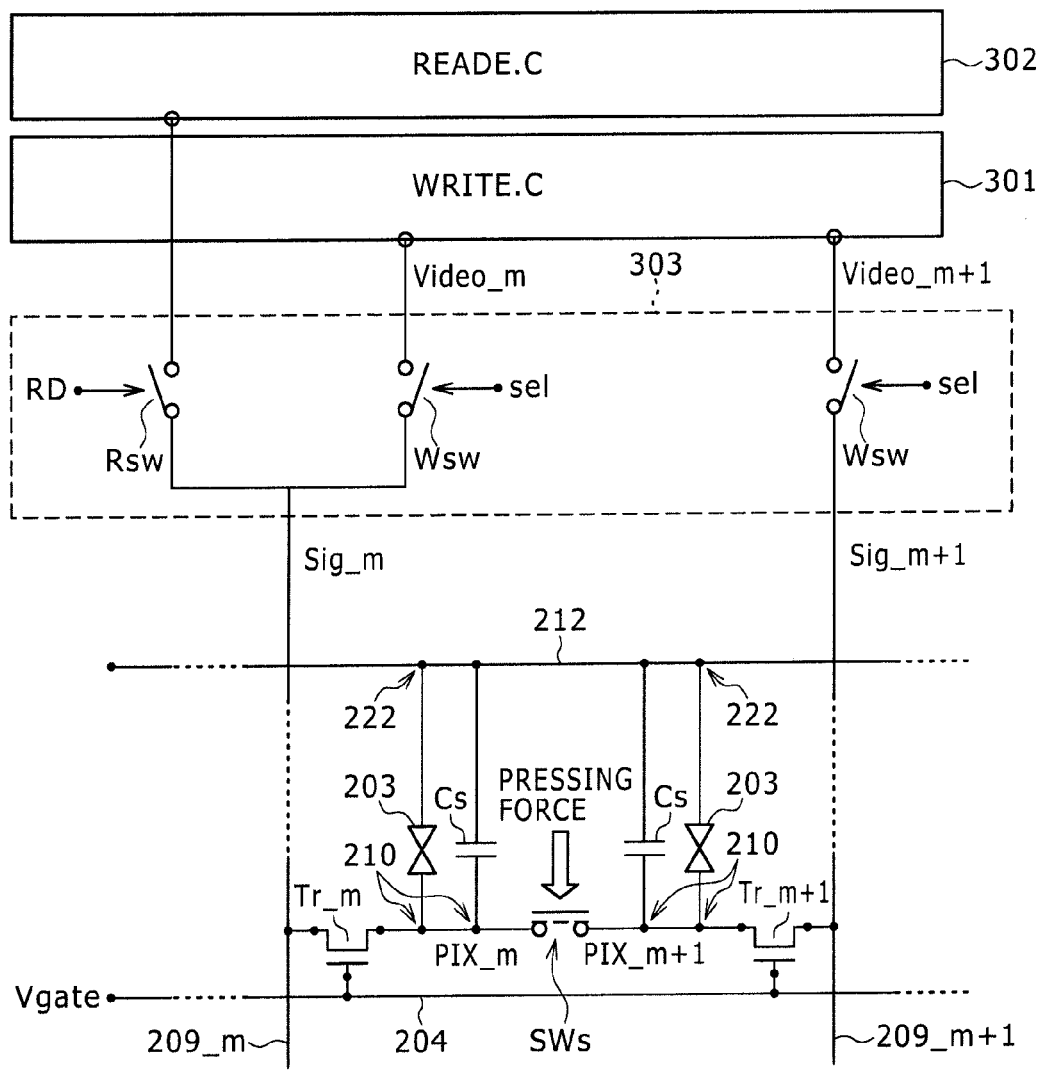
FIG. 2 is a circuit diagram, partly in block, showing a configuration of an equivalent circuit for two pixels, and a sensor drive circuit in the liquid crystal display device according to the embodiment of the present invention.

FIG. 2 shows an equivalent circuit of adjacent two pixels together with a circuit for touch detection, and a circuit for data write. In FIG. 2, a configuration of two-point contact touch detection is shown.

In the equivalent circuit of the adjacent two pixels PIX_m and PIX_m+1 illustrated in FIG. 2, the constituent elements which have already been described with reference to FIG. 1 are designated by the same reference numerals as those in FIG. 1, respectively.

Here, one electrode of a capacitor having the liquid crystal layer 203 as a capacitor dielectric is formed by the pixel electrode 210, and the other electrode thereof is formed by the common electrode 222.

When the voltage holding ability is insufficient in the capacitor having the liquid crystal layer 203 as the capacitor dielectric, the hold capacitor $C_s$ is connected as shown in FIG. 2. As previously stated, the hold capacitor $C_s$ is composed of the pixel electrode 210, the common electrode 222, and the insulating film 207.

A sensor switch $SW_s$ is formed between the two pixel electrodes 210 of the adjacent two pixels PIX_m and PIX_m+1. The sensor switch $SW_s$ is a switch having a manipulation piece (switch piece) which is adapted to contact or not to contact isolated two terminals of the adjacent two pixels PIX_m and PIX_m+1. The manipulation piece (switch piece) is actually composed of the part of the pixel electrode 210, and the pixel short-circuit electrode 223 facing each other through the liquid crystal layer 203. The two terminals of the manipulation piece (switch piece) are connected to the two pixel electrodes 210 of the adjacent two pixels PIX_m and PIX_m+1, respectively.

As shown in FIG. 2, the sensor switch $SW_s$ is turned ON with a pressure (pressing force) when the color filter substrate 201 is externally pressed with a finger or the like, and returns back to an OFF state when the pressure is released.

One of a source terminal and a drain terminal of the transistor Tr is connected to the pixel electrode 210, and the other of the source terminal and the drain terminal thereof is connected to the signal line 209. In FIG. 2, of all the signal lies 209, in particular, the signal line connected to the pixel PIX_m is designated by reference symbol "209_m," and the signal line connected to the pixel PIX_m+1 is designated by reference symbol "209_m+1."

Gate terminals of the two transistors Tr are each connected to a gate control line 204. A gate voltage $V_{gate}$ is supplied from a scanning circuit such as a vertical driver (not shown) to the gate terminal of the transistor Tr through the gate electrode 204. The transistor Tr is controlled in accordance with the potential of the gate voltage $V_{gate}$.

The common electrode 222 is connected to a supply line (a $V_{com}$ wiring 212) for a common voltage $V_{com}$. The common voltage $V_{com}$, and a voltage obtained by inverting the common voltage $V_{com}$ (an inverted common voltage $_xV_{com}$) are alternately supplied from a $V_{com}$ drive circuit (not shown) to the $V_{com}$ wiring 212. It is noted that although a partial drive circuit such as a vertical driver is formed within the liquid crystal panel 200, the $V_{com}$ drive circuit is normally disposed outside the liquid crystal panel 200.

A write circuit (WRITE.C) 301 and a read circuit (READ.C) 302 are provided as constituent circuits within a horizontal drive portion of the liquid crystal display device 100. Although the write circuit (WRITE.C) 301 and the read circuit (READ.C) 302 may be provided within the liquid crystal panel 200, the write circuit (WRITE.C) 301 and the read circuit (READ.C) 302 are normally disposed in the form of an IC outside the liquid crystal panel 200.

In addition, a horizontal selector 303 for controlling supply timings of video signals Video ( . . . , Video_m, Video_m+1, . . . ) is provided between the write circuit 301 and the read circuit 302, and the pixel array. The horizontal selector 303 is normally formed within the liquid crystal panel 200 in a process for forming TFT transistors.

The read circuit 302 is a circuit having a function of detecting the touch. The write circuit 301 is a circuit having a function of generating and supplying the video signals Video for the image display, and has a function as well of supplying a voltage previously set in a phase of the touch detection, for example, a precharge voltage. For this reason, in the embodiment, the write circuit 301 has a function as well of "a voltage setting circuit."

The horizontal selector 303 has write switches $W_{sw}$ each of which is turned ON in a phase of supply of either the video signals Video or the precharge voltage. In addition, the horizontal selector 303 has a read switch $R_{sw}$ which is turned ON when information on ON/OFF of the sensor switch $SW_s$ is transmitted from corresponding one of the signal lines 209 to the read circuit 302.

It should be noted that although the connection form of the write switches $W_{sw}$ and the read switch $R_{sw}$ is illustrated in FIG. 2, the illustration means that the horizontal selector 303 has the function of these two kinds of switches $W_{sw}$ and $R_{sw}$, and thus the concrete circuit connection form is by no means limited to that shown in FIG. 2. In addition, the switch for the video signals Video and the precharge voltage may be separated into two parts for the video signals Video and the precharge voltage. Moreover, when the write circuit 301 and the read circuit 302 are separately disposed on one side and the other side facing each other through the pixel array, the function of the horizontal selector 303 may be suitably, decentrally disposed.

Such variety of the embodiment will be described later.

The configuration for the contact detection shown in FIG. 2 may be provided every pixel. In this case, the write switches $W_{sw}$ and the read switch $R_{sw}$ are connected in parallel with the corresponding one(s) of the signal lines 209.

However, the object of the contact detection is the finger or the like, and is sufficiently larger than the pixel size. Thus, the precision of detecting the contact position enough to fulfill such a situation is unnecessary. In addition, the addition of the contact detecting function increases the number of switches irrespective of the display. For this reason, in adding the contact detecting function, it is also necessary to consider such a condition that the disposition space of the sensor switch $SW_s$ itself, and the number of write switches and read switch $W_{sw}$ and $R_{sw}$ within the horizontal selector 303 are prevented from becoming the restrictions for the pixel disposition. In other words, the precision of detecting the contact position (minimum detection pitch) has an optimal value larger than the pixel pitch.

From the reason described above, it is better that the configuration shown in FIG. 2 is disposed every predetermined multiple number which is one or more times as large as the pixel pitch to which, for example, one of R, G and B is allocated in each of the vertical and horizontal directions.

The base of the operation of the equivalent circuit of the adjacent two pixels PIX_m and PIX_m+1, and the circuit for the touch detection and the circuit for the data write in FIG. 2 will be described in brief as follows.

With the configuration shown in FIG. 2, in detecting the touch, the potential $V_{com}$ having the same polarity as that in the $V_{com}$ wiring 212 is supplied to the signal line 209_m+1 adjacent to the signal line 209_m with which the sensor output is detected in advance through the write switch $W_{sw}$ on the signal line 209_m+1 side. In addition, the voltage $_xV_{com}$ having an opposite polarity is supplied to the signal line 209_m with which the sensor output is detected in advance. This setting of the voltages is called "precharge." After that, the write switch $W_{sw}$ on the signal line 209_m side is turned OFF, so that the signal line 209_m becomes an electrical floating state at the $_xV_{com}$ level.

After completion of the precharge, when a gate voltage $V_{gate}$ of a gate control line 204 transits to an activation level ("H" in the embodiment), the two transistors Tr within the two pixels PIX_m and PIX_m+1 are each turned ON. At this time, when a pressing force is applied to the liquid crystal panel 200 (refer to FIG. 1) by application of the external force, the liquid crystal panel 200 is bent, and thus the two pixel electrodes 210 of the adjacent two pixels PIXs are electrically short-circuited through the common electrode 222. As a result, a current is caused to flow from the signal line 209_m+1 to the signal line 209_m through the sensor switch $SW_s$. As a result, the potential of the signal line 209_m held in the floating state changes.

On the other hand, when the sensor switch $SW_s$ is not turned ON, the potential of the signal line 209_m does not change.

The read switch $R_{sw}$ is turned ON in a stage in which the change in potential of the signal line 209_m due to turn-ON/OFF of the sensor switch $SW_s$ is decided, and a sense amplifier within the read circuit 302 detects presence or absence of the potential change described above.

As a result, presence or absence (and the position where the contact is made) of the contact can be detected.

On the other hand, the display control for writing the video signals Video to the pixel electrodes 210, respectively, is carried out through the write switches $W_{sw}$. At this time, when the sensor switch $SW_s$ is held in the ON state, the display gradations are identical between the adjacent pixels. However, there is no inconvenience even when the display gradation is different from the corresponding one of the video signals Video because this operation is carried out below the finger.

According to the embodiment of the present invention, the sensor switch $SW_s$ is not a one-point contact switch, but the two-point contact switch. In the case of the one-point contact switch, when there is the foreign matter in the contact portion, and thus the short-circuit is normally caused, the one-point contact switch itself does not function. However, in the case of the two-point contact switch $SW_s$ shown in FIGS. 1 and 2, even when the pixel short-circuit electrode 223 and the pixel electrode 210 on one side are normally short-circuited, an open state can be maintained between the two pixel electrodes 210 unless the external force is applied to the color filter substrate 201.

For this reason, in particular, it is possible to largely reduce the fault probability that the function of the sensor switch $SW_s$ is not brought out due to the presence of the conductive foreign matter.

In addition, since the precharge voltage is supplied from the signal line 209 of the adjacent pixel, it is unnecessary to dispose the wiring specially only for the precharge. In addition, with regard to the sensor switch $SW_s$ itself, as shown in FIG. 1, it is merely necessary that the two height adjusting layers 211 are disposed side by side, and the pixel short-circuit electrode 223 is formed in the local portion corresponding to the disposition of the two height adjusting layers 211. Therefore, an increase in area due to the changing of the system of the sensor switch $SW_s$ from the one-point contact system over to the two-point contact system is suppressed as much as possible, thereby providing a level at which an influence is hardly exerted on the display characteristics of each of the pixels.

<2. First Example>

In a first example, a concrete example of the embodiment of the present invention described above is shown.

Figure 3:
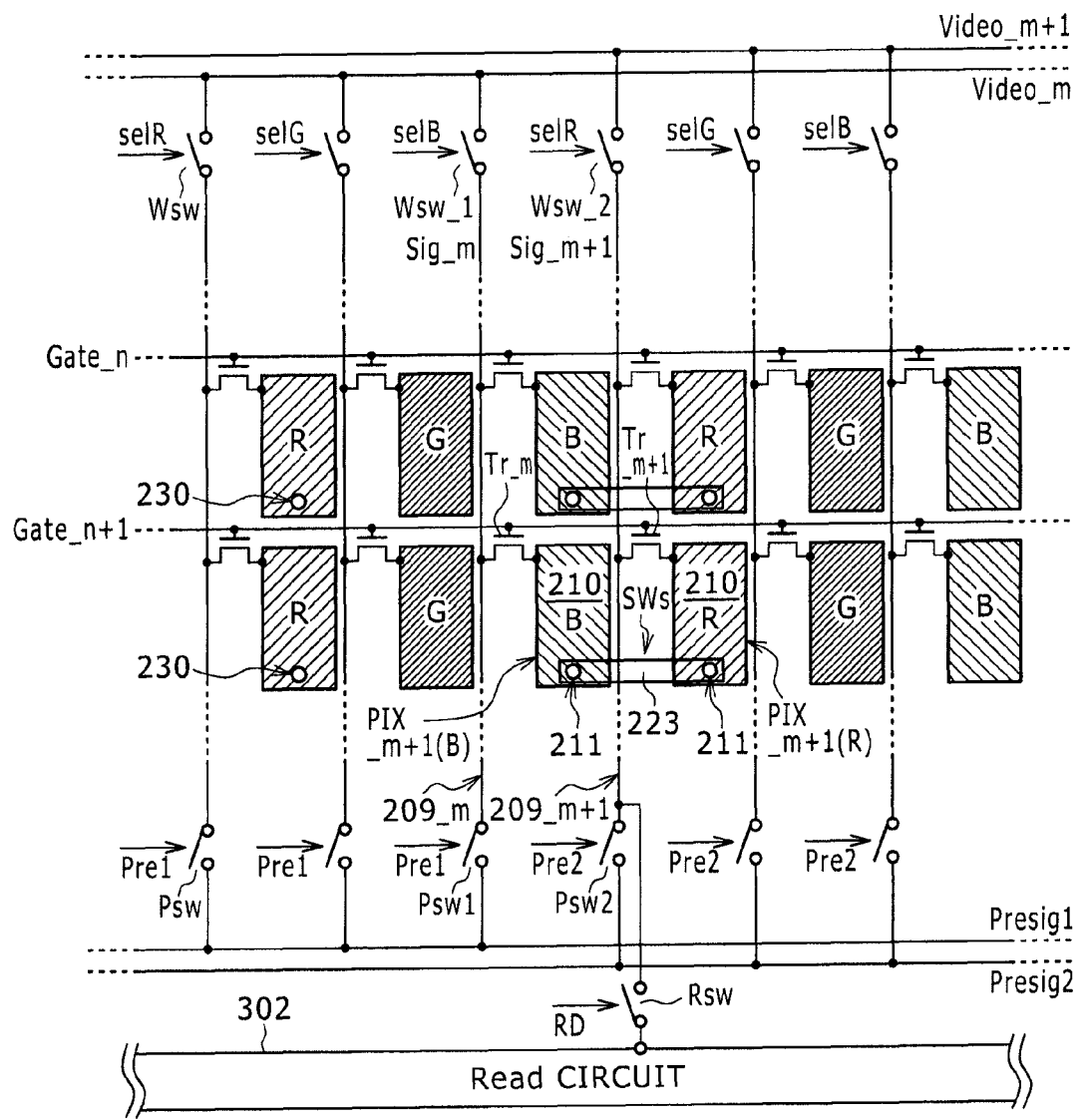
FIG. 3 is a circuit diagram showing a configuration of pixels and a sensor drive circuit in a liquid crystal display device according to a first example of the embodiment of the present invention.

FIG. 3 shows a configuration of a liquid crystal display device according to the first example of the embodiment of the present invention.

In the liquid crystal display device illustrated in FIG. 3, the colors of R, G and B are repeatedly disposed every row of the pixels forming corresponding one of the display lines, and the same color of R, G or B is disposed in the same column of the pixels. This color disposition is determined in the color filter layer 220 shown in FIG. 1.

Similarly to the case of FIG. 1, the configuration shown in FIG. 3 is also such that the precharge is carried out for the signal line corresponding to a certain color (B pixels) in advance, and the information on the contact detection is read out from the R pixels of another color adjacent to the B pixels concerned. However, the signal line through which the potential is supplied, and the signal line through which the touch is detected are left-hand reversed between the configuration of FIG. 2 and the configuration of FIG. 3. In a word, in FIG. 3, the output signal from the contact sensor is obtained in the signal line 209_m+1.

Here, "a three-line selector system" means a system for successively controlling the supply of the electric charges to the signal lines 209 every color in the horizontal pixel deposition of the R, G and B.

More specifically, the supply lines for the video signals Video are separated into plural M systems, and the video signals Video are repeatedly supplied in the form of line-sequential pulse trains each having a short duration to the M supply lines, respectively.

FIG. 3 shows the two supply lines of the video signal Video_m (0≦m≦M) of a certain m-th system, and the video signal Video_m+1 of the next (m+1)-th system. It is noted that when n=M, a value of m changes so that a relationship of m+1=0 is obtained.

More specifically, the signal lines 209 corresponding to the left-half pixels of 3×2 of the pixels of 6×2 shown in FIG. 3 are each connected to the supply line for the video signal Video_m through the respective write switches $W_{sw}$. In addition, the signal lines 209 corresponding to the right-half pixels of 3×2 of the pixels of 6×2 shown in FIG. 3 are each connected to the supply line for the video signal Video_m+1 through the respective write switches $W_{sw}$. It is noted that for the write switches $W_{sw}$ shown in FIG. 3, the write switch for the B pixels, and the write switch for the R pixels which belong to the different systems, respectively, are designated by reference symbols "$W_{sw}$_1" and "$W_{sw}$_2," respectively. Thus, the two write switches $W_{sw}$ are illustrated and designated by reference symbols, respectively.

Although omitted in illustration in FIG. 3, the write circuit 301 shown in FIG. 2 is disposed on the side of the supply lines for the video signals Video_m and Video_m+1.

The read circuit 302 is disposed on the side across the pixel array from the side of the disposition of the write circuit 301.

For this reason, the read switch $R_{sw}$ as a part of the function of the horizontal selector 303 is disposed away from each of the write switches $W_{sw}$.

The read switch $R_{sw}$ is connected to the signal line 209_$m$+1, corresponding to the R pixels, from which the sensor output is obtained.

It is noted that in the three-line selector system, the point-sequential drive for the write switches $W_{sw}$ can be carried out every color. The write switch $W_{sw}$ corresponding to the R pixel column is controlled by a select signal selR. Likewise, the write switch $W_{sw}$ corresponding to the G pixel column is controlled by a select signal selG, and the write switch $W_{sw}$ corresponding to the B pixel column is controlled by a select signal selB.

On the other hand, the read switch $R_{sw}$ is controlled by a read signal RD.

The select signals selR, selG and selB, and the read signal RD, for example, are supplied from a CPU, an IC or the like provided within the liquid crystal display device 100, but outside the liquid crystal panel 200.

Referring to FIG. 3, attention is paid to the B pixel PIX_m belonging to the second column, and the R pixel PIX_m+1 next to the B pixel PIX_m.

The pixel short-circuit electrode 223 is disposed so as to overlap in position the two height adjusting layers 211 of the two pixels PIX_m and PIX_m+1, thereby forming the sensor switch $SW_s$. In FIG. 3, the sensor switch $SW_s$ is also formed between the B pixel and the R pixel belonging to the first row similarly to the case of the B pixel and the R pixel belonging to the second row. However, it is also allowed to dispose the sensor switch $SW_s$ every plural pixels in a column direction.

On the other hand, the spacers 230 are disposed in two portions which are located at an equal distance from the sensor switch $SW_s$ in the row direction. Although the spacers 230 may be provided every row in the column direction, the first example shows the case where the spacers 230 are formed in the second row.

The sensor switch $SW_s$ is preferably formed in the vicinity of the center between the portions in which the spacers 230 are disposed, respectively, because the largest bending of the color filter substrate 201 is obtained in the portion having the sensor switch $SW_s$ disposed therein.

However, the dispositions of the sensor and the spacers of the pixel arrangement are by no means limited to those shown in FIG. 3. The feature of the first example is that in addition to the write switches $W_{sw}$, the precharge switches $P_{sw}$ are connected onto the signal lines Sig, respectively, and the read switch $R_{sw}$ is connected to the signal line 209 corresponding to the R pixel, thereby controlling the connection between the Read circuit 302 and the signal line 209 for the R pixel.

With regard to the feature in configuration of the first example, the precharge switch $P_{sw}$ is provided as the switch within the horizontal selector 303 (refer to FIG. 2) every signal line 209.

A precharge switch $P_{sw}1$ connected to the signal line 209_$m$ corresponding to the B pixel column, and a precharge switch $P_{sw}2$ connected to the signal line 209_$m$+1 corresponding to the R pixel column are shown in FIG. 3 correspondence to the two pixels PIX_m and PIX_m+1 to which attention is paid, respectively.

It is noted that the supply lines for the precharge voltages are separated into m systems corresponding to the operations for supplying the video signals Video, respectively, thereby allowing the video signals Video to be supplied. Specifically, the three precharge switches $P_{sw}1$ which are simultaneously turned ON in accordance with the control by a precharge control signal $P_{re}1$ when the precharge voltages from the supply lines for a precharge signal (voltage) $P_{resig}1$ are set in the signal lines 209, respectively, are formed in the left-hand side three columns of FIG. 3, respectively. In addition, the three precharge switches $P_{sw}2$ which are simultaneously turned ON in accordance with the control by a precharge control signal $P_{re}2$ when the precharge voltages from the supply lines for a precharge signal (voltage) $P_{resig}2$ are set in the signal lines 209, respectively, are formed in the right-hand side three columns of FIG. 3, respectively.

FIGS. 4A to 4L show respectively timing charts when the liquid crystal display device of the first example shown in FIG. 3 is driven by utilizing the three-line selector system.

Figure 4:
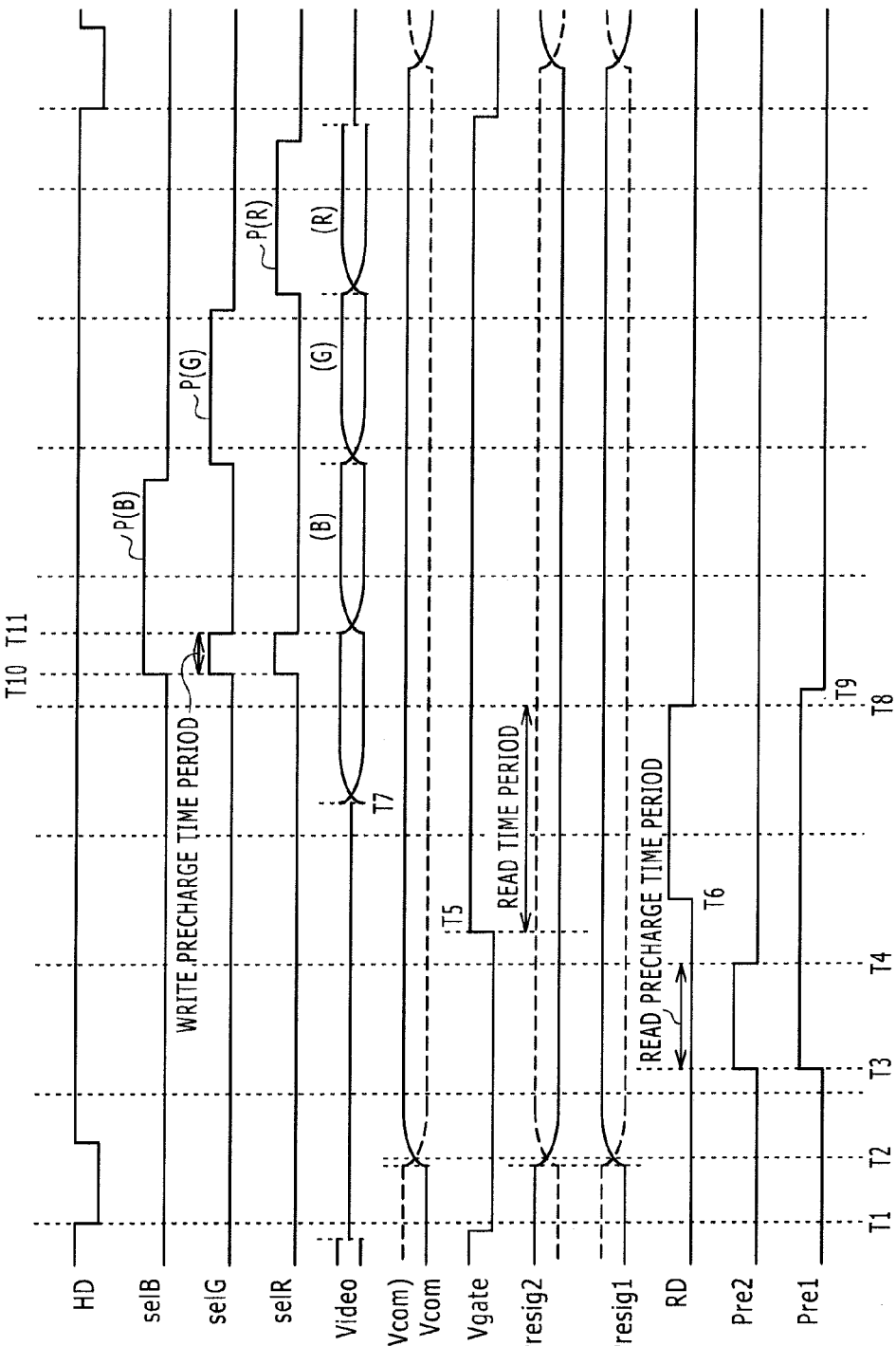
FIGS. 4A to 4L are respectively timing charts explaining sensor drive and display write control in the liquid crystal display device according to the first example of the embodiment of the present invention.

A horizontal synchronous signal HD shown in FIG. 4A is a signal in which transition from a high level (hereinafter referred to as "H") to a low level (hereinafter referred to as "L") for a predetermined time period is repeated with time T1 as a starting point with a cycle time of a horizontal time period (1H).

As shown in FIG. 4F, the potential (the common voltage $V_{com}$) of the common electrode 222 is decided as either "H" or "L" in accordance with that the horizontal synchronous signal HD transits from "H" to "L" at the time T1. The common voltage $V_{com}$ is inverted between "H" and "L" every horizontal time period (1H). At this time, the inverted common voltage $_xV_{com}$ is driven with an inverted phase. FIG. 4F shows the case where the common voltage $V_{com}$ is decided as "H" at a timing of time T2.

As shown in FIGS. 4H and 4I, the precharge voltages $P_{resig}1$ and $P_{resig}2$ are decided in opposite phase with each other approximately concurrently with the time T2. In this case, the precharge voltage $P_{resig}1$ is decided as "H," and the precharge voltage $P_{resig}2$ is decided as "L."

At time T3 at which the potentials after decision of the precharge voltages $P_{resig}1$ and $P_{resig}2$ are stabilized, as shown in FIGS. 4K and 4L, both precharge control signals $P_{re}1$ and $P_{re}2$ are activated (transit to "H" in the first example). For this reason, both the precharge switches $P_{sw}1$ and $P_{sw}2$ shown in FIG. 3 are turned ON. As a result, the precharge voltages $P_{resig}1$ and $P_{resig}2$ are supplied to the signal lines 209_$m$ and 209_$m$+1, respectively, thereby carrying out the precharge.

That precharge is called "read prechaege," and continues up to time T4.

At the time T4, since the precharge control signal $P_{re}2$ transits to "L," the precharge switch $P_{sw}2$ is turned OFF, so that the signal line 209_$m$+1 corresponding to the R pixel column becomes a floating state. However, at this time point, the precharge switch $P_{sw}1$ is held in the ON state.

At time T5 following the time T4, as shown in FIG. 4G, the gate voltage $V_{gate}$ is activated at "H." As a result, both the transistors Tr_m and Tr_m+1 are turned ON.

At this time, when the external force is large to a certain extent, the sensor switch $SW_s$ is turned ON, so that the pixel electrode 210 of the B pixel PIX_m shown in FIG. 3, and the pixel electrode 210 of the R pixel PIX_m+1 shown in FIG. 3 are short-circuited. For this reason, the signal line 209_$m$ held in the floating state at "L" is connected to the signal line 209_$m$+1 fixed at "H" via the transistor Tr_m+1, the pixel electrode 210 (R pixel), the pixel short-circuit electrode 223, the pixel electrode 210 (B pixel), and the transistor Tr_m. As a result, the signal line 209_$m$ transits to "H."

On the other hand, when either no external pressure is applied or the external pressure is smaller than the pressure for the detection sensitivity, the sensor switch $SW_s$ is held in the OFF state, and the signal line 209_$m$ is also maintained in the floating state at "L."

When the read signal RD shown in FIG. 4J is activated at time T6, the read switch $R_{sw}$ shown in FIG. 3 is turned ON, and the potential of the signal line 209_m+1 is outputted to the read circuit 302 through the read switch $R_{sw}$. The sense amplifier within the read circuit 302 detects the potential of the signal line 209_m+1 by, for example, utilizing a technique for comparing the potential of the signal line 209_m+1 with a predetermined reference potential, thereby judging whether or not there is the contact.

After that, the precharge voltage $P_{resig}1$ in phase with the common voltage $V_{com}$ continues to be applied. Therefore, the common voltage $V_{com}$ is set in the signal line 209 at time T7 while the precharge control signal $P_{re}1$ is held at "H" (refer to FIG. 4L).

At this time, the charge/discharge of the electric charges is hardly generated because the potentials of "H" such as the precharge control signal $P_{re}1$ and the common voltage $V_{com}$ are set in the signal lines 209 of the trio of the R, G and B pixels to which the B pixel PIX_m belong. For this reason, the wasteful power consumption is suppressed.

On the other hand, the potential of the $V_{com}$ wiring 212 of the trio of the R, G and B pixels to which the R pixel PIX_m+1 belongs is set at "L" due to the contact detection in some cases. Therefore, the common voltage $V_{com}$ of "H" has to be set in the $V_{com}$ wiring 212.

After that, the select signals selB to selR are successively set in the order of blue (B), green (G) and red (R), thereby inputting (writing) the signal electric charges for the respective colors to the pixels. However, all the select signals selB to selR are set for a short time period at the pulse leading portion (a time period from T10 to T11) of the first select signal selB of blue (B), thereby justifying the signal line potentials with the reference potential for the video signals. The write precharge is carried out in the manner described above.

After that, the B pixel write pulse P(B) continues, and for this time period, B pixel signals each having a predetermined crest value relative to the reference potential for the video signals are written to the B pixels in the display line at all once. Subsequently, a G pixel write pulse P(G), and a R pixel write pulse P(R) are given in order, and for the respective time periods, the G pixel signals and the R pixel signals are written to the G pixels and the R pixels, respectively, at all once.

As a result, each of the pixel trios emits a light with the color corresponding to the voltage ratio among the pixel signals of R, G and B.

In the first example, the precharge switches $P_{sw}$ and the write switches $W_{sw}$ are formed separately from each other, and the common voltage $V_{com}$ is set so that the charge/discharge does not have to be carried out from the potential after completion of the read precharge so much. After that, the precharge for write is specially carried out.

Even with such a method, it is possible to realize the two point contact touch sensor in which the probability of the switching impossibility due to the presence of the conductive foreign matter is reduced, and the drive circuit for driving the same.

In the drive circuit, the adjacent signal line 209 can be used as the precharge line similarly to the case of the embodiment described above. For this reason, the number of wirings does not have to be increased in the row direction in the pixel arrangement. In addition, the sensor switch can be simply configured. Also, since the read switches $R_{sw}$ and the write switches $W_{sw}$ composing the horizontal selector 303 are decentrally disposed on the both sides of the pixel array, there is a margin in the row direction of the switch disposition, and thus a circuit design is easily carried out.

<3.Second Example>

In a second example, another concrete example of the embodiment of the present invention will be shown.

Figure 5:
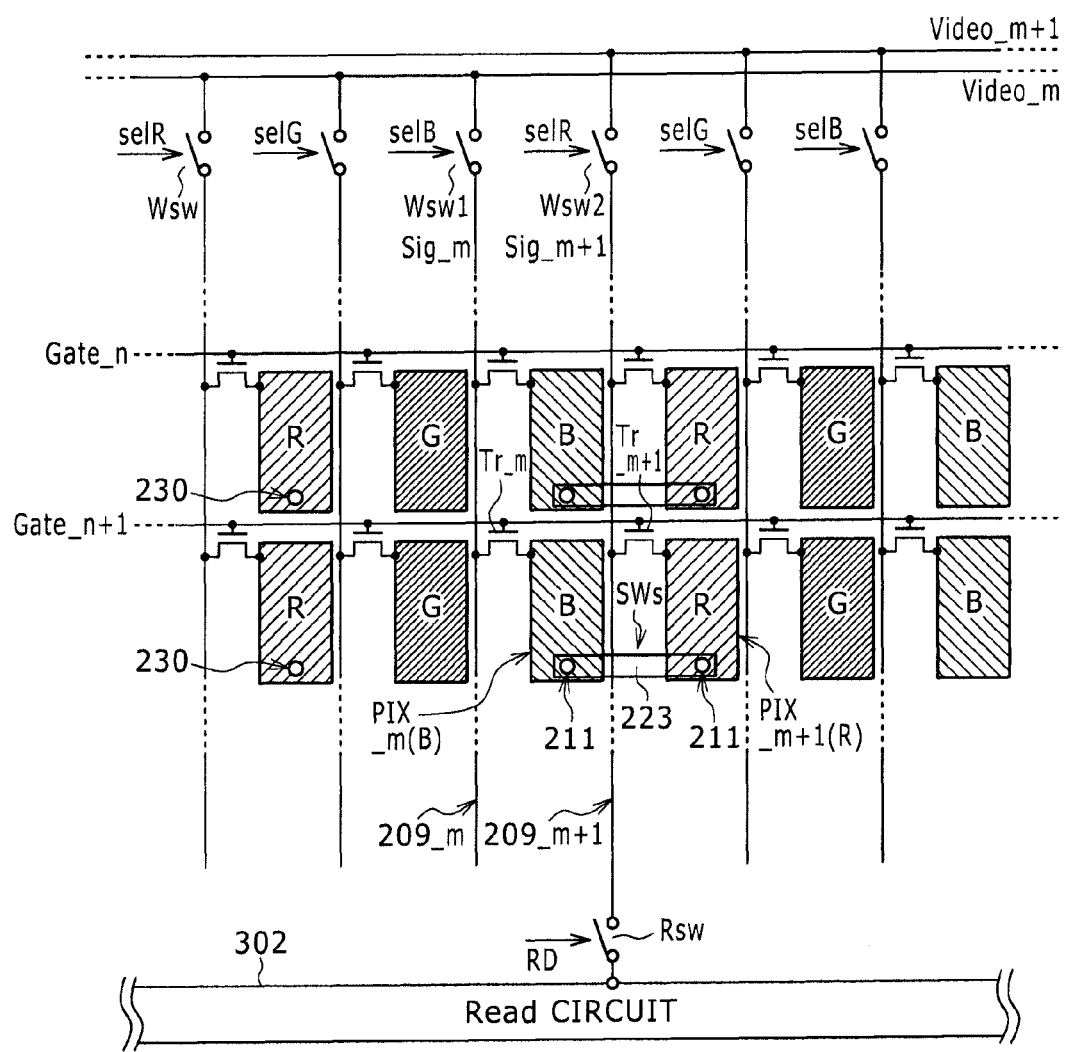
FIG. 5 is a circuit diagram showing a configuration of pixels and a sensor drive circuit in a liquid crystal display device according to a second example of the embodiment of the present invention.

FIG. 5 shows a configuration of a liquid crystal display device according to the second example.

The liquid crystal display device illustrated in FIG. 5 is different from the liquid crystal display device of the first example shown in FIG. 3 in that the write switches $W_{sw}$ serve as the precharge switches $P_{sw}$ as well.

Therefore, the liquid crystal display device according to the second example has an advantage that a burden imposed on the circuit merely has to be lightened all the more because of the above simple configuration. Other constituent elements are designated by the same reference symbols as those in FIGS. 1 to 3, respectively, and a description thereof is omitted here for the sake of simplicity.

FIGS. 6A to 6I show respectively timing charts based on a drive method of, although a three-line selector system is utilized, controlling the read precharge by the select signals.

In FIGS. 6A to 6I, the meaning of a time period from time T1 to time T11, in a word, a starting point and an ending point of the time period, and the meaning of the potential decision and the wiring connection are basically identical to those in FIGS. 4A to 4L.

The timing charts of FIGS. 6A to 6I are different from those of FIGS. 4A to 4L in that a time period from time T3 to time T4 for the read precharge is mainly regulated based on a time period for which the select signal selB held at "H" and shown in FIG. 6B, and the select signal selR held at "H" and shown in FIG. 6D overlap each other.

In addition, another point of difference in configuration between the first example and the second example is that the supply lines for the video signals Video are used because the read precharge is controlled by the select signals.

Moreover, the signals in opposite phase with each other have to be supplied through adjacent two signal lines 209_m and 209_m+1 corresponding to the R pixel column side and the B pixel column side, respectively, prior to start of the time period from the time T3 to the time T4 for the read precharge. Specifically, when the common voltage $V_{com}$ is set in the signal line 209_m to which the B pixel column is connected as shown in FIG. 6E, the inversed common voltage $_xV_{com}$ having the opposite polarity (opposite phase) has to be set in the signal line 209_m+1 adjacent the signal line 209_m as shown in FIG. 6F.

The potential Sig_m+1 of the signal line 209_m+1, as shown in FIG. 6F, has to be inversed into the potential Sig_m of the common voltage $V_{com}$ in the vicinity of time T5 after completion of the read precharge. On the other hand, the potential Sig_m of the signal line 209_m has to be held as it is because the common voltage $V_{com}$ is set in the signal line 209_m.

In addition, at least up to completion (time T8) of the read time period, the select signal selB has to be activated, thereby ensuring the electric charge supply path for the sensor switch $SW_s$.

The write operation at and after time T10 is the same as that shown in FIGS. 4A to 4L.

Even with such a method, it is possible to realize the two point contact touch sensor in which the probability of the switching impossibility due to the presence of the conductive foreign matter is reduced, and the drive circuit for driving the same.

In the drive circuit of the liquid crystal display device of the second example, the circuit configuration is simple because the write switches $W_{sw}$ serve as the precharge switches $P_{sw}$ as well. On the other hand, the opposite-polarity voltage drive for the signal lines has to be carried out for the read precharge in accordance with the control by the select signals. Therefore, the drive circuit of the liquid crystal display device of the second example is slightly disadvantageous in the complexity of the control, and the time as compared with the case shown in FIGS. 4A to 4L. Also, the power consumption caused by the charge/discharge is slightly increased.

As has been stated, the first example and the second example have their own merits and demerits.

<4. Modification of Second Example>

A modification of the second example will be described below.

In this modification of the second example, the circuit configuration is common to the second example (refer to FIG. 5).

FIGS. 7A to 7I show respectively time charts of the modification of the drive method in the second example shown in FIGS. 6A to 6I.

A first point of difference between FIGS. 6A to 6I and FIGS. 7A to 7I is that for the precharge shown in FIG. 7E, the potential Sig_m+1, of the signal line 209_m+1, given from the corresponding one of the video signal Video is set as the power source voltage VDD of the power source different from that for the common voltage $V_{com}$. In addition, a second point of difference between FIGS. 6A to 6I and FIGS. 7A to 7I is that the potential Sig_m of the signal line 209_m adjacent to the signal line 209_m+1 is set as a reference voltage VSS different from the inversed common voltage $_xV_{com}$.

For example, a potential difference ($V_{com}$ inversed amplitude) between the common voltage $V_{com}$ and the inversed common voltage $_xV_{com}$ is larger than that (power source amplitude) between the power source voltage VDD and the reference voltage VSS in some cases. On the other hand, the power source amplitude is enough to detect the contact sensor in other cases. In such cases, the carrying out of the $V_{com}$ inversed amplitude may be largely wasteful in terms of the electric power as well.

In such cases, a modification that the power source amplitude is used for the contact detection, and thereafter, the $V_{com}$ setting is made from time T8 is also possible.

By setting the precharge level as the power source amplitude level in such a manner, it becomes possible to start the precharge for the signal lines without waiting for the decision of the common voltage. As a result, each of the subsequent reading operation and writing operation can be given a margin. In addition, the charge/discharge current in the phase of the read precharge is greatly reduced.

It is noted that the same effect as that in each of the embodiment, and the first and second examples in that it is possible to realize the two-point contact touch sensor in which the probability of the switching impossibility due to the presence of the conductive foreign matter is reduced, and the drive circuit for driving the same can be obtained even with such control. In addition, the circuit configuration is simple similarly to the case of the second example.

<5.Modifications>

In any of the embodiment, the first and second examples, and the modification of the second example, one-side electrode of the sensor switch $SW_s$ is the pixel electrode 210. However, this configuration has to be necessarily adapted.

In a word, the other electrode of the sensor switch $SW_s$ different from the pixel short-short electrode 223 thereof may be provided every pixel separately from the electrode, such as the pixel electrode 210, in which the electric charges for the display are accumulated. In addition, wirings for the sensor may be provided separately from the gate control lines 204 and the signal lines 209 through which the transistors Tr are controlled for the display. When these wirings for the sensor are specially provided, the connection control elements may also be provided separately from the transistors Tr.

However, it is preferable in terms of suppression of an increase in area that as with any of the embodiment, the first and second examples, and the modification of the second example, the configuration for the touch detection is used as the pixel configuration as well for the display to a maximum extent.

In addition, the electric charge supply pixel for the contact detection is by no means limited to the pixel adjacent to the pixel concerned, and thus may also be the pixel which is located at a distance of several pixels from the pixel concerned. For example, there may also be adopted a configuration that the sensor detection current is caused to flow when the connection between the two pixels (the pixel electrodes 210) is attained in two portions over the three pixels in total. In this case, the contact is detected when the two switches each having two contacts are simultaneously turned ON. As a result, the probability of the switching fault caused by the presence of the conductive foreign matter is dramatically reduced.

Moreover, the present invention can also be applied to a liquid crystal display device having any other suitable mode other than the FFS mode. For example, the present invention can also be applied to even a liquid crystal display device in which the common electrodes 222 are formed on the color filter substrate 201 side with respect to the liquid crystal layer 203. In this case, the liquid crystal display device, for example, has "a VA ECB mode."

<6.Application Examples>

Figure 8A:
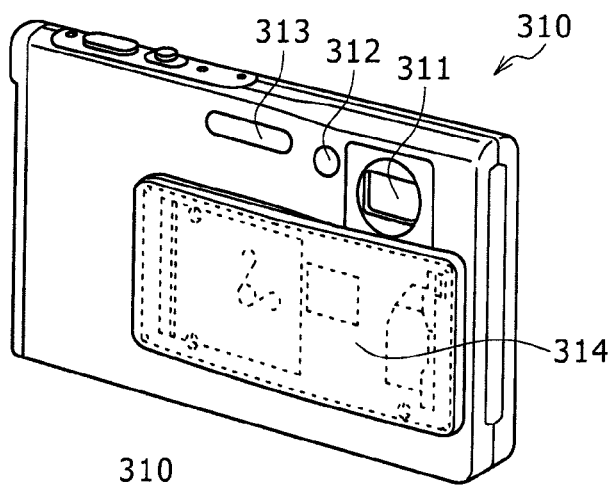
FIGS. 8A and 8B are respectively a perspective view of a digital camera as a first example, when viewed from a front side, to which the embodiment of the present invention is applied, and a perspective view of the digital camera as the first example, when viewed from a back side, to which the embodiment of the present invention is applied.
Figure 8B:
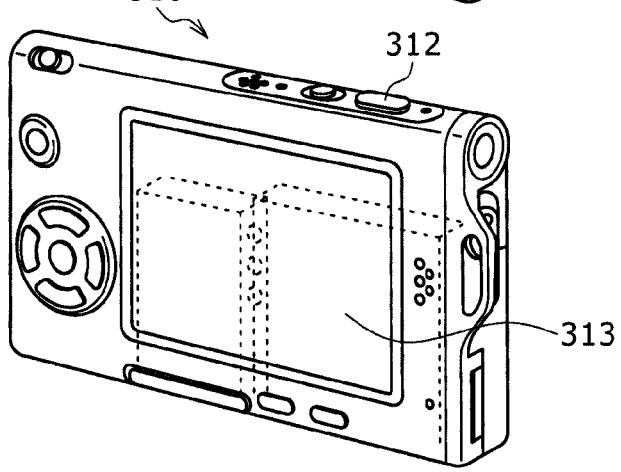

FIGS. 8A and 8B are respectively perspective views each showing a digital camera as a first example to which the embodiment of the present invention is applied. Also, FIG. 8A is a perspective view when the digital camera is viewed from a front side, and FIG. 8B is a perspective view when the digital camera is viewed from a back side.

The digital camera 310 illustrated in FIGS. 8A and 8B includes an image capturing lens provided within a protective cover 314, a light emitting portion 311 for flash, a display portion 313, a control switch, a menu switch, a shutter 312, and the like. The digital camera 310 is manufactured by using the liquid crystal display device with the touch sensor according to the embodiment of the present invention as the display portion 313.

Figure 9:
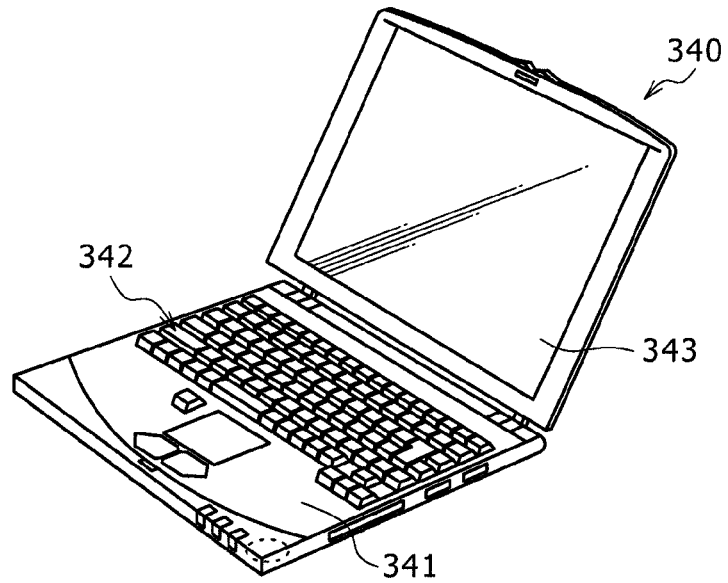
FIG. 9 is a perspective view showing a notebook-size personal computer as a second example to which the embodiment of the present invention is applied.

FIG. 9 is a perspective view showing a notebook-size personal computer to which the embodiment of the present invention is applied.

The notebook-size personal computer 340 illustrated in FIG. 9 includes a keyboard 342 which is provided in a main body 341 and which is manipulated when characters or the like are inputted, and a display portion 343, for displaying thereon an image, which is provided in a main body cover. The notebook-size personal computer 340 is manufactured by using the liquid crystal display device having the display panel with the touch sensor according to the embodiment of the present invention as the display portion 343.

Figure 10A:
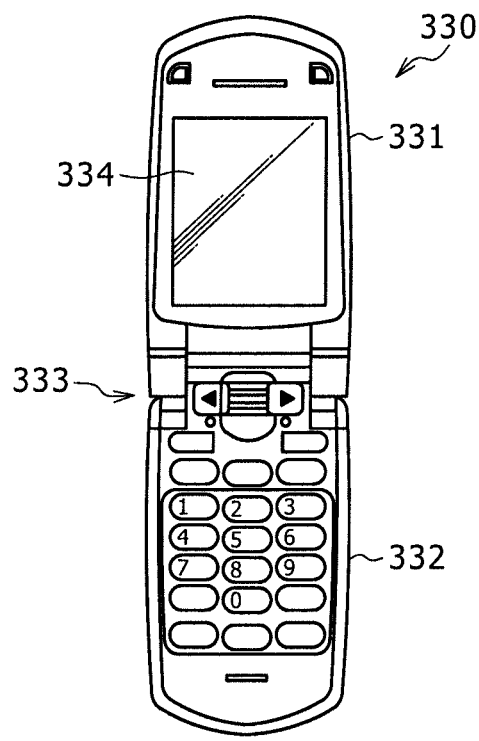
FIGS. 10A and 10B are respectively a front view of mobile terminal equipment, in an open state, to which the embodiment of the present invention is applied, and a front view of the mobile terminal equipment, in a close state, to which the embodiment of the present invention is applied.
Figure 10B:
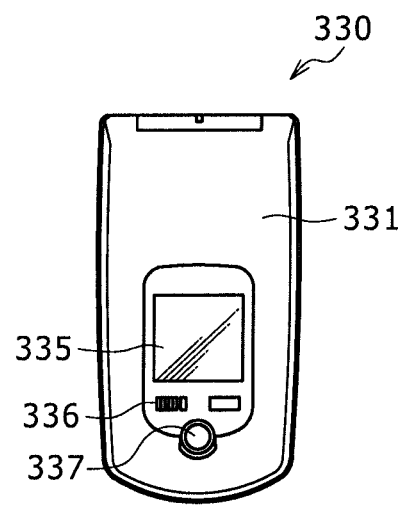

FIGS. 10A and 10B are respectively views showing mobile terminal equipment as a third example to which the embodiment of the present invention is applied. Also, FIG. 10A is a front view in an open state of the mobile terminal equipment, and FIG. 10B is a front view in a close state of the mobile terminal equipment.

The mobile terminal equipment 330 illustrated in FIGS. 10A and 10B includes an upper chassis 331, a lower chassis 332, a connection portion (a hinge portion in this case) 333, a display portion 334, a sub-display portion 335, a picture light 336, a camera 337, and the like. The mobile terminal equipment 330 is manufactured by using the liquid crystal display device having the display panel with the touch sensor according to the embodiment of the present invention as either the display portion 334 or the sub-display portion 335.

Figure 11:
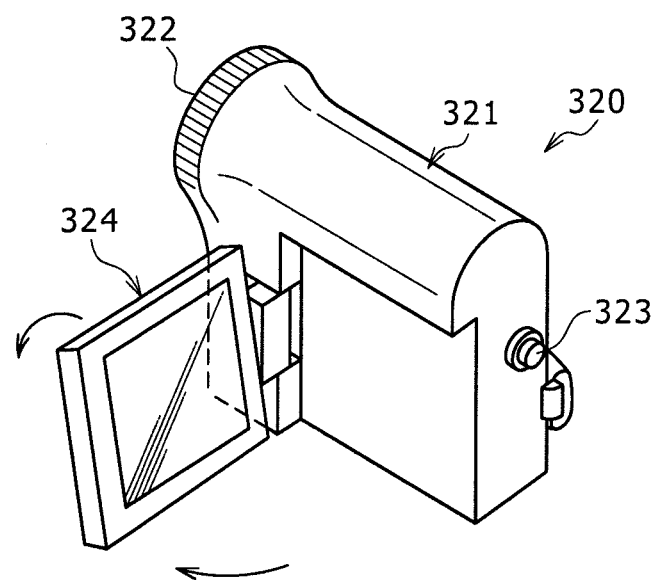
FIG. 11 is a perspective view showing a video camera as a fourth example to which the embodiment of the present invention is applied.

FIG. 11 is a perspective view showing a video camera as a fourth example to which the embodiment of the present invention is applied.

The video camera 320 illustrated in FIG. 11 includes a main body portion 321, a lens 322 which captures an image of a subject and which is provided on a side surface directed forward, a start/stop switch 323 which is manipulated when an image of a subject is captured, a monitor 324, and the like. The video camera 320 is manufactured by using the liquid crystal display device having the display panel with the touch sensor according to the embodiment of the present invention as the monitor 324.

According to the embodiment, the first and second examples of the embodiment, the modification of the second example, the modifications of the embodiment, and the application examples, the following effects are obtained.

Of each close (or adjacent) two signal lines, the potential is supplied to one signal line, and the other is held in the electrical floating state. As a result, the change in level of the signal line held in the floating state is detected, whereby it is possible to detect the two-point contact between the counter electrode and the adjacent two pixels (or the three or more-point contact among the three or more pixels).

With the configuration described above, before the one signal line is held in the electrical floating state, the charge is carried out in advance to obtain the level different from that of the one signal line, thereby enhancing the operation margin.

With the configuration described above, the potential supply lines through which the potentials having the different levels can be supplied are connected to the signal lines through the switches, respectively, and the control lines through which the switches can be turned ON or OFF at the different timings are added. As a result, the signal line control as described above becomes possible.

The configuration described above has the switches through which the video signal lines for the video signals supplied from the outside, and the signal lines are connected to each other. Also, these switches are turned ON or OFF at the different timings, and the different potentials are supplied through the video signal lines connected to those switches, respectively. As a result, the signal line control as described above becomes possible.

With the configuration described above, the precharge level of the signal line is set as the potential different from that of the common voltage, whereby it is possible to start the precharge for the signal line without waiting for the decision of the common voltage. As a result, each of the subsequent reading operation and writing operation can be given the margin. In addition, the precharge level is set as the D.C. level (for example, the power source amplitude level), whereby the charge/discharge current in the phase of the read precharge is greatly reduced.

As described above, according to the embodiment and modifications thereof, it is possible to realize the output read system for the contact sensor in which addition of the circuits is suppressed as much as possible because the probability of the short-circuit due to the presence of the conductive foreign matter, the process dispersion or the like is reduced.

The present application contains subject matter related to that disclosed in Japanese Priority Patent Application JP 2009-015129 filed in the Japan Patent Office on Jan. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device, comprising:
   a first substrate;
   a second substrate;
   a liquid crystal layer formed between said first substrate and said second substrate;
   a display function region formed between the first substrate and the second substrate, the display function region having an image display function, and wherein a video signal is supplied from a signal line via a transistor in each pixel and a display pixel electrode is formed on the first substrate;
   at least one short pixel electrode is formed on the second substrate such that by pressing on either the first substrate or the second substrate, a short is caused for two adjacent pixel electrodes via the short pixel electrode, and a sensor drive circuit detects a signal level change based on contact with the short pixel electrode.

2. The liquid crystal display device according to claim 1, wherein said first sensor electrode is a pixel electrode to which a video signal is supplied from corresponding one of signal lines through corresponding one of transistors within pixels in a phase of display, and
   said second sensor electrode is at least one short-circuit piece through which the two pixel electrodes of the adjacent two pixels is adapted to be short-circuited in accordance with application of the pressing force.

3. The liquid crystal display device according to claim 2, wherein said first wiring and said second wiring are signal lines which are connected to said pixel electrode provided every pixel through corresponding one of said transistors.

4. The liquid crystal display device according to claim 2, further comprising:
   a common electrode for driving said liquid crystal layer based on a potential difference caused between a voltage of the pixel electrode provided every pixel and a voltage of said common electrode;
   wherein said sensor drive circuit makes said second wiring in a floating state after the same voltage as a common voltage by which said common electrode is driven is set in said first wiring, and an inversed voltage of the common voltage is applied to said second wiring.

5. The liquid crystal display device according to claim 2, further comprising:
   a common electrode for driving said liquid crystal layer based on a potential difference caused between a voltage of the pixel electrode provided every pixel and a voltage of said common electrode;
   wherein said sensor drive circuit makes said second wiring in a floating state after a first voltage, having the same polarity as that of a common voltage by which said common electrode is driven, which is different from the common voltage is set in said first wiring, and a second voltage having a potential difference between the first voltage and the second voltage which is smaller than that between an inversed voltage of the common voltage and the common voltage is set in said second wiring.

6. The liquid crystal display device according to claim 1, wherein said sensor drive circuit comprises:
   a voltage setting portion for applying a voltage to said first wiring;
   a wiring controlling portion for making said second wiring in a floating state in a state in which there is a potential difference between the voltage and a voltage of said second wiring in the floating state; and a read portion for reading that the plurality of first sensor electrodes are electrically connected to each other through said second sensor electrode from a change in potential of said second wiring in the floating state.

7. The liquid crystal display device according to claim 1, wherein said sensor drive circuit serves as a circuit as well for carrying out display write control following sensor drive control, and said sensor drive circuit uses a voltage of said first wiring as a reference voltage in a phase of the display write control, and sets the reference voltage in said second wiring prior to the write.

8. The liquid crystal display device according to claim 1, further comprising:

a pixel array having pixels disposed in a matrix; and a write circuit for controlling supply of video signals from plural M video signal lines to said pixel array through an M-phase drive switch circuit;

wherein said sensor drive circuit receives supply of the voltage for said first wiring from one of different two video signal lines of the M video signal lines driven by said write circuit, makes said second wiring connected to the other of the different two video signal lines in a floating state by separating said second wiring from said write control circuit by said M-phase drive switch circuit, and detects a change in potential based on a contact between the sensor electrodes in said second wiring in the floating state.

* * * * *